455-296 SR
FIP8106 XR 3,671,867
X5698D X5620C X5432E X5112H

United Stat [redacted]
Schwarz

[15] 3,671,867
[45] June 20, 1972

[54] NOISE SUPPRESSION ARRANGEMENT FOR COMMUNICATION RECEIVERS

[72] Inventor: Hans G. Schwarz, Pennington, N.J.
[73] Assignee: The United States of America as represented by the Secretary of the Navy

[22] Filed: April 15, 1970
[21] Appl. No.: 28,704

[52] U.S. Cl. ....325/410, 325/323, 325/473
[51] Int. Cl. ....H04b 1/16
[58] Field of Search ....328/165; 325/323, 324, 326, 325/473, 474, 480, 482, 400, 402, 408, 409, 410; 178/7.3 R, 7.3 DC, DIG. 12

[56] References Cited

UNITED STATES PATENTS

| | | | |
|---|---|---|---|
| 2,498,659 | 2/1950 | DeRosa | 325/326 X |
| 2,510,983 | 6/1950 | Krause | 325/326 X |
| 2,785,302 | 3/1957 | Adams | 328/165 |
| 3,076,145 | 1/1963 | Copeland et al. | 325/324 X |
| 3,430,068 | 2/1969 | McTaggart | 178/DIG. 12 |
| 3,441,669 | 4/1969 | Janson et al. | 178/DIG. 12 |

*Primary Examiner*—Benedict V. Safourek
*Attorney*—R. S. Sciascia and L. I. Shrago

[57] ABSTRACT

A noise suppression technique for a communication receiver is disclosed wherein the amplitude of the signal at the clipping point with respect to the clipping level, or vice versa, is automatically adjusted so that clipping takes place during a constant preset percentage of time. The gain of the RF or IF stages or the clipping level is automatically adjusted to achieve this mode of operation.

5 Claims, 2 Drawing Figures

Figure 1:
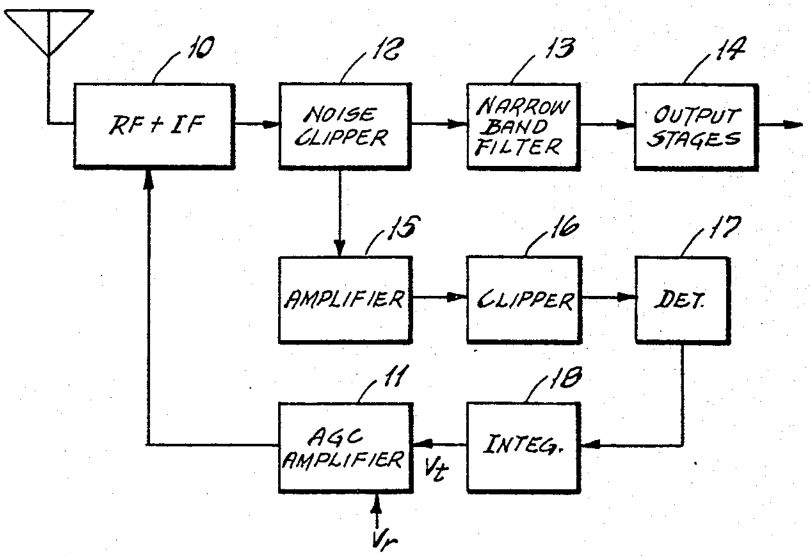

INVENTOR
HANS G. SCHWARZ

NOISE SUPPRESSION ARRANGEMENT FOR COMMUNICATION RECEIVERS

The invention described herein may be manufactured and used by or for the Government of the United States of America for governmental purposes without the payment of any royalties thereon or therefor.

The present invention relates generally to communication systems and, more particularly, to an improved noise suppression arrangement for use in a receiving system processing binary signal information.

The principle of noise reduction by clipping or blanking noise pluses in the wide-band front end of a receiver, followed by a narrow band filter just wide enough to pass the signal, has been used in the past in various communication systems. In these systems the duration of the noise pulse in the wide-band channel has to be short compared to the duration of an information bit. This condition is satisfied in the case of teletype transmissions in the presence of atmospheric impulsive noise. The width of a typical spheric pulse is normally in the range of 0.1 to 1 millisecond, whereas the length of an information bit is in the order of from 20 to 40 milliseconds.

By incorporating a noise limiting circuit into a receiver of conventional design, that is, a receiver with the usual automatic gain control circuit, one cannot take full advantage of the noise limiting capabilities of the limiting circuit. This can be seen from the following analysis. The conventional automatic gain control circuit is designed and functions to maintain the R.M.S. output amplitude $V_t$ of the IF amplifier at a constant level. To accomplish this, $V_t$ is compared with a reference voltage $V_r$ at the input of the automatic gain control circuit. Whenever $V_t$ differs from $V_r$, the automatic gain control circuit develops an appropriate bias voltage which changes the gain of the RF amplifying stages and/or the IF amplifier. Thus, the automatic gain control circuit tends to hold the IF output voltage at a level equal to the reference voltage.

Assuming, for the sake of simplicity, ideal automatic gain control action, the IF amplifier output voltage will be maintained constant independent of the signal and noise amplitudes at the input of the receiver. The amplitude of the signal voltage component in the signal plus noise composite signal occurring at the IF amplifier output will, however, depend on the signal-to-noise ratio. In practice, the signal-to-noise ratio in the wide-band channel of a teletype receiver can reach values as high as +20 to +30 dB under good receiving conditions. However, acceptable reception is still possible for signal-to-noise ratios in the order of −10 dB provided the clipping level of the noise limiting circuit is optimized with respect to the signal amplitude.

For a receiver with a conventional AGC circuit, it can be shown that the signal amplitude at the output of the IF amplifier depends on the signal-to-noise ratio and that this amplitude changes particularly fast for relatively low signal-to-noise ratios, that is, under receiving conditions where the proper operation of the noise clipping circuit is most important. Thus, for example, where a signal-to-noise ratio is +30 dB, the signal amplitude $V_s$ will be equal to 0.9995 $V_t$, under the idealized conditions assumed. When this ratio is +10 dB, the signal amplitude $V_s$ still is of the order of 0.9535 $V_t$. However, when the signal-to-noise ratio is at −10 dB, $V_s$ is only equal to 0.3015 $V_t$.

In the receiver arrangement previously mentioned, the IF output voltage $V_t$ is also the input voltage of the noise clipping stage. In its usual operation, the noise clipper functions with a fixed clipping level $V_C$. Any portion of the noise, the information signal or the composite mixture of signal and noise, which exceeds this level, is thus clipped.

Although a rigorous mathematical proof is not available, it can, nevertheless, be reasoned that for frequency shift keying reception the clipping level for optimum performance of a noise limiter should be equal to, or approximate, the peak amplitude of the information signal. If the clipping level is substantially higher than this value, additional unwanted noise is passed through the circuit. Likewise, if it is substantially lower than this value, not only additional noise but, also, part of the desired information signal is clipped. This qualitative analysis is corroborated by experimental evidence. From the considerations recited above, the optimum performance of the noise limiting circuit should obtain under the condition $V_c \approx \pm \sqrt{2}\, V_s$, where $V_s$ represents the root means square voltage and the ± sign indicates that clipping is applied both for positive and negative excursions of the signal wave form. However, since $V_s$, as noted above, varies with signal-to-noise ratio over a substantial range, satisfactory operation of the noise limiting circuit, in combination with the conventional automatic gain control circuit, is only achievable within a very narrow range of signal-to-noise ratios. This serious drawback can be greatly improved, if not eliminated, by means of the present invention.

It is accordingly a primary object of the present invention to provide an improved noise suppression circuit arrangement for use in a receiver that is adapted to process teletype or binary signal information.

Another object of the present invention is to provide an automatic gain control circuit for a receiver which adjusts the amplitude of the input signal so that it exceeds a fixed threshold level for a constant portion of the signal bit.

Another object of the present invention is to provide a noise suppression arrangement for a teletype signal receiver having automatic gain control wherein the clipping level is varied so that a preset percentage of time during which the signal plus noise amplitude exceeds this level is held constant.

Figure 2:
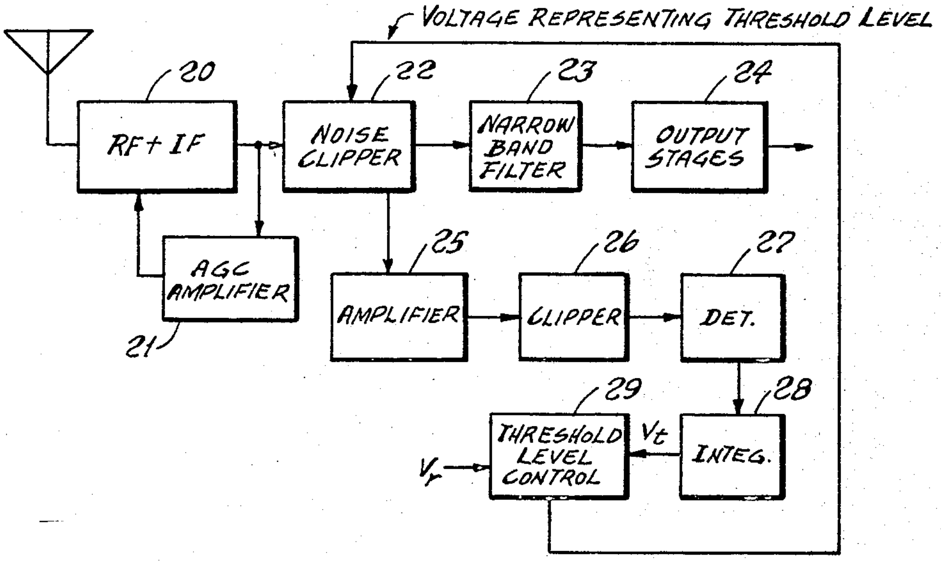

Other objects, advantages and novel features of the invention will become apparent from the following detailed description of the invention when considered in conjunction with the accompanying drawings wherein:

FIG. 1 is a block diagram of one embodiment of the invention wherein the noise cancellation circuit operates with a fixed clipping level and the automatic gain control circuit is controlled to achieve the constant time duration clipping effect; and FIG. 2 is an alternative modification wherein the clipping level of the noise suppression circuit is varied to achieve this same result.

It has been verified by experimental tests that the error rate in a teletypewriter receiving system processing, for example, frequency shift signals due to impulsive atmospheric disturbances depends critically on the amplitude of the signal at the clipping point relative to the clipping level. In receivers of conventional design, the signal level at the clipping point, as discussed hereinbefore, depends on the signal-to-noise ratio and is susceptible to large variations. Consequently, in practice, it is extremely unlikely that the critical ratio of signal-to-clipping level associated with optimum receiver performance is either encountered or maintained over the entire range of signal-to-noise ratios and noise amplitude distributions encountered.

In the receiver arrangements of the present invention, means are provided for automatically adjusting the amplitude of the signal at the clipping point with respect to the clipping level, or vice versa, so that clipping takes place during a constant preset percentage of time. In one case, the receiver operates with a fixed threshold level in the noise suppression stage, and the gain of the RF or IF stages are automatically adjusted in such a way that the signal amplitude at the clipping point becomes essentially independent of the signal-to-noise ratio then existing. In an alternate form, the receiving apparatus utilizes a conventional automatic gain control circuit so that the signal amplitude at the input of the noise suppression stage can vary with the signal-to-noise ratio. However, a control circuit similar to the one utilized in connection with the automatic gain control feature of the first method is employed to adjust the clipping level of the noise suppression circuit such that the signal amplitude-to-clipping ratio is again held constant at the proper value and independent of the signal-to-noise ratio then present. It will be appreciated that in both situations the percentage of time the noise suppression circuit is active, that is, the time during which clipping occurs, is held constant.

Referring now to FIG. 1 of the drawings, which is a box diagram of one embodiment of the invention, it will be seen that the over-all teletype receiving system includes the usual radio frequency and intermediate frequency amplifying circuits 10 whose gain characteristic is under the control of an automatic gain control circuit 11.

The output of the IF section which corresponds to the signal $V_t$, previously identified, serves as the input to a noise clipper 12. This noise clipper may, in fact, consist of two independent clipping circuits, such as, appropriately biased diodes, connected such that one output thereof which is fed to narrow band filter 13, tuned to pass the IF signal, and output stage 14 corresponds to that portion of the wave form of $V_t$ which is below the threshold level of the clipper while another output which is supplied to amplifier 15 corresponds to the complementary portion of the same wave from which exceeds this threshold level. Circuits for selectively transmitting part of a wave form which lies above or below some particular voltage level, as mentioned hereinbefore, are well known in the prior art and have been referred to as "limiters", "amplitude selectors" or "slicers." Clipping circuits such as those just mentioned are described in the book, "Pulse Digital and Switching Wave Forms," by Millman and Taub, published by McGraw Hill, Inc., 1965 , and in Chapter 7, entitled "Clipping and Comparator Circuits."

The input signal to amplifier 15 consists of a sequence of signal portions of variable fractional length, with each of the portions indicating the length of time the signal at noise clipper 12 is being clipped. Thus, the duration of each of these signal portions is a measure of the clipping time. Amplifier 15 is of conventional design, and its output is fed to a clipper which has a fixed threshold level. This clipper produces variable length pulses at the IF frequency of uniform amplitude and here, again, the duration of each particular pulse corresponds to the portion of time during which each information bit is experiencing clipping as a result of its instantaneous amplitude being above the established threshold level. This pulse train is fed to a detector 16 which transforms the intermediate frequency pulses into unidirectional pulses. These unidirectional pulses are then integrated in circuit 18, providing an output signal $V_t$ in the form of a slowly varying unidirectional signal.

It will be appreciated that the output of integrator, $V_t$, will have an amplitude related to the total time noise clipper 12 operates during a given signal reception interval to cut-off portions of the composite information and noise signal appearing in the output of the IF amplifier. The integration period, as is well known, may be adjusted to correspond to any given number of information bits.

The output of integrator 18, $V_t$, is compared to a reference voltage $V_r$ within the automatic gain control circuit 11, and the gain of the RF and/or IF stages is automatically adjusted so as to equalize these voltages. For example, if $V_t$ is less than $V_r$, a condition indicating that the clipping level is too high, i.e., the percentage of time clipping occurs is less than that required for optimum receiver performance, the gain of amplifier 10 increases. Consequently, the voltage $V_t$ at noise clipper 12 increases, clipping now will occur more often, and the increased number and durations of the clipped portions of $V_t$, appearing at amplifier 15 result in an increased output signal from integrator 18 to rebalance the circuit.

It will thus be seen that the circuit of FIG. 1 acts to keep $V_t$ equal to $V_r$ and, in doing so, it maintains constant the percentage of time during which clipping occurs in the noise clipper 12. This percentage of time is established by the magnitude of $V_r$ and, by merely adjusting the amplitude of this signal, different percentage times may be realized.

FIG. 2 illustrates an alternative arrangement wherein the RF and IF circuits 20 are under the control of a conventional automatic gain control circuit 21 which tends to stabilize the signal appearing at the input-to-noise clipper 22 at a constant level, $V_t$. Noise clipper 22, unlike its counterpart 12 in FIG. 1, does not operate at a fixed threshold level. Instead, this level is varied, as will be seen hereinafter. In this connection, one output from noise clipper 22, representing the signal wave form below the threshold level of clipper 22, is again fed to a narrow band filter 23 and an output circuit 24 just as in the case of the system of FIG. 1. Likewise, another output of this clipper, representing the complementary portion of the signal that is above the then established level 22, is fed to amplifier 25, clipper 26, detector 27 and integrator 28, thus producing the unidirectional, slowly varying signal $V_t$. The voltage $V_t$ from integrator 28 is compared to a reference voltage $V_r$ in a threshold level control circuit 29, and the differential signal resulting therefrom is utilized to establish a new threshold level of noise clipper 22. The differential voltage will have a sign and a magnitude depending upon the relative amplitude of the compared voltages, and it will either increase or decrease the previous threshold level so as to equalize $V_t$ and $V_r$. Thus, again, the control circuit operates to keep these voltages equal and, in doing so, automatically changes the clipping level so as to produce clipping for a certain percentage of time, depending upon the amplitude of $V_r$ chosen.

It will be seen that circuit of FIG. 2 adjusts the threshold level of the noise suppression circuit such that the ratio of signal amplitude to clipping level is again held essentially constant and independent of the signal-to-noise ratio. In both FIGS. 1 and 2, this effect is accomplished by holding constant the percentage of time the noise suppression circuit is active.

The optimum percentage of time during which clipping should take place, or that value which results in a minimum number of errors being received, depends on the bandwidth of the wide-band channel in which clipping takes place relative to the information bandwidth. It also depends on the type of modulation. For a given modulation and receiver design, the optimum time percentage may best be determined experimentally. In the systems of FIGS. 1 and 2, it can be adjusted by varying the voltage $V_r$ or, in FIG. 1, by applying a known fraction of the voltage $V_t$ to the automatic gain control amplifier.

For frequency shift keying signals and for phase shift keying signals, it has been deduced theoretically and confirmed by experiment that a minimum of bit errors occurs when the percentage of time during clipping occurs is greater than 50 to 60 percent. For example, in the case where it is assumed that optimum receiving conditions are realized for a clipping time of 80 percent, the signal amplitude will adjust itself for very high signal-to-noise ratios so that the clipping level is just barely below the top of the signal wave. Thus, the system clips off the tops of the signal wave. The resulting loss in signal power is negligible. This situation stays substantially the same when the impulse noise increases by a nominal amount. Only when the noise increases considerably, corresponding, for example, to a signal-to-noise ratio of −20 to −30 dB, will the signal amplitude decrease below the clipping level, since the clipping can now take place during 80% of the time on the signal-plus-noise mixture alone. When this happens, however, the error rate will have reached an unacceptable level even for an optimum setting. Thus, the circuits of FIGS. 1 and 2 will keep the signal level essentially constant relative to the clipping level over the entire signal-to-noise ratio range of critical interest.

What is claimed is:

1. In a superheterodyne receiver for minimizing the effects of atmospheric impulsive noise on binary signals being received, the combination of a radio frequency amplifying circuit;

an intermediate frequency amplifying circuit connected thereto;

signal clipping means connected to the output of said intermediate frequency circuit and operating to produce a first signal consisting of those peak portions of the amplified intermediate frequency signal whose amplitude exceeds a predetermined threshold level and a second signal consisting of those portions of the intermediate frequency signal whose amplitude is below said threshold level;

means responsive to said first signal for adjusting the gain of said radio frequency amplifying circuit or the gain of said intermediate frequency amplifying circuit such that said signal clipping means produces a second signal during a predetermined percentage of the intermediate frequency signal time;

a narrow band filter; and means for feeding said second signal to the input of said narrow band filter so as to develop an output signal in its output circuit.

2. In a superheterodyne communication receiver for minimizing the effects of atmospheric impulsive noise on the reception of binary signals, the combination of a radio frequency amplifying circuit;

an intermediate frequency amplifying circuit connected thereto;

a limiting circuit connected to said intermediate frequency amplifying circuit for clipping the amplified intermediate frequency signals to a preset amplitude level;

means responsive to the peak portions of the intermediate frequency signals which exceed said preset level for adjusting said preset level so that clipping of said intermediate frequency signals occur during a predetermined percentage of intermediate frequency signal time;

a narrow band filter; and means for feeding the intermediate frequency signals that have been clipped to the input of said narrow band filter, thereby to develop output signals in its output circuit.

3. A noise suppression arrangement for use in a superheterodyne communication receiver of the type having a radio frequency amplifying circuit and an intermediate frequency amplifying circuit connected thereto, comprising signal clipping means connected to the output of said intermediate frequency circuit and operating to produce a first signal consisting of those portions of the amplified intermediate frequency signal whose amplitude exceeds a threshold level and a second signal consisting of those portions of the intermediate frequency signal whose amplitude is below said threshold level;

means for amplifying said first signal;

means for clipping and detecting said amplified first signal;

means for integrating said detected signal so as to develop a control signal;

means for comparing the amplitude of said control signal with a reference voltage representing a predetermined percentage of intermediate frequency signal clipping time and for producing a difference voltage indicative of the inequality thereof;

means responsive to said difference voltage for controlling the relative levels of the intermediate frequency signal and said threshold level so that said signal clipping means operates during said predetermined percentage of intermediate frequency signal time; and a narrow band filter connected to said signal clipping means for developing an output signal from said second signal.

4. In an arrangement as defined in claim 3 wherein said means responsive to the difference voltage for controlling the relative levels of the IF signal and said threshold level regulates the gain of said radio frequency amplifying circuit or said intermediate frequency amplifying circuit.

5. In an arrangement as defined in claim 3 wherein said means responsive to the difference voltage for controlling the relative levels of the IF signal and said threshold level regulates said threshold level.

* * * * *